April 15, 1941.  G. E. M. PERROUX  2,238,229
SYSTEM FOR EMITTING DIRECTED RADIANT ENERGY
Filed May 27, 1938  2 Sheets-Sheet 1

RADIATOR FOR PRODUCING SYMMETRICALLY DISPLACED PATTERNS WITH RESPECT TO X, Y

APPARENT VIRTUAL SOURCE FOR RADIATIONS REFLECTED AT A, B

RADIATOR FOR PRODUCING ALTERNATELY DISPLACED PATTERNS HAVING MAJOR AND MINOR LOBES TANGENT IN A GIVEN DIRECTION

INVENTOR
G. E. M. PERROUX
BY
ATTORNEY

April 15, 1941.  G. E. M. PERROUX  2,238,229
SYSTEM FOR EMITTING DIRECTED RADIANT ENERGY
Filed May 27, 1938  2 Sheets-Sheet 2

INVENTOR.
G.E.M. PERROUX
ATTORNEY.

Patented Apr. 15, 1941

2,238,229

UNITED STATES PATENT OFFICE 2,238,229

SYSTEM FOR EMITTING DIRECTED RADIANT ENERGY

Georges Edme Marcel Perroux, Paris, France, assignor to International Standard Electric Corporation, New York, N. Y.

Application May 27, 1938, Serial No. 210,345
In France June 11, 1937

11 Claims. (Cl. 250—11)

The present invention relates to direction finding systems and particularly to arrangements for controlling the radiation diagram of a directional antenna.

It is well-known that in systems transmitting directed radiant energy, particularly in systems of directional guiding by complementary signals, causes external to the system produce harmful disturbances in certain directions and produce an undesirable distribution of the field in space. One of such disturbances among others is due to the presence near the emitting antennae of obstacles which reflect the waves.

One object of the present invention is to provide a method and arrangements for overcoming and practically cancelling these disturbing effects.

The method of eliminating these disturbing effects aforementioned adopted by the present invention consists in radiating from the antenna an auxiliary radiation directed towards the reflecting object.

If the main radiation diagram is stationary, then the auxiliary radiation may be an additional radiation directed towards the reflecting object and is modulated in a characteristic manner. Then, when a radio operator utilising the directive system receives the reflected wave, he will know from the modulation that he is in the direction in which the signals received from the directive antenna are due to the radiations reflected from the reflecting object and do not therefore give a correct indication of his bearings.

If the main radiation diagram is subject to movement as in systems in which the diagram is oscillated about a directive axis, the additional radiation need only be transmitted periodically and in those periods when the reflecting object is outside of the main radiation diagram, owing to the movement of the diagram, and is so modulated as to give a continuous dash with the reflected main radiation signals. Alternatively the shape of the main radiation diagram may be so varied as it moves so that when the reflecting object is brought outside the principal lobe of the radiation diagram due to the movement of this later, a minor lobe is directed towards the reflecting object and its size is so adjusted that it is tangential to the principal lobe, if the two lobes were simultaneously in the same direction, and it is arranged that the point of contact of the two lobes under the stated conditions lies on the reflecting object. By this means the strength of the auxiliary reflected radiation and the main reflected radiation is kept constant. Then, by thus obtaining a continuous dash in the reflection direction, the characteristic signals of the main radiation received directly can be easily distinguished.

Arrangements for carrying out the various alternative methods are well known in the art and need not be described herein.

The invention will be explained in detail in the following description in conjunction with the attached drawings in which.

Figure 1:
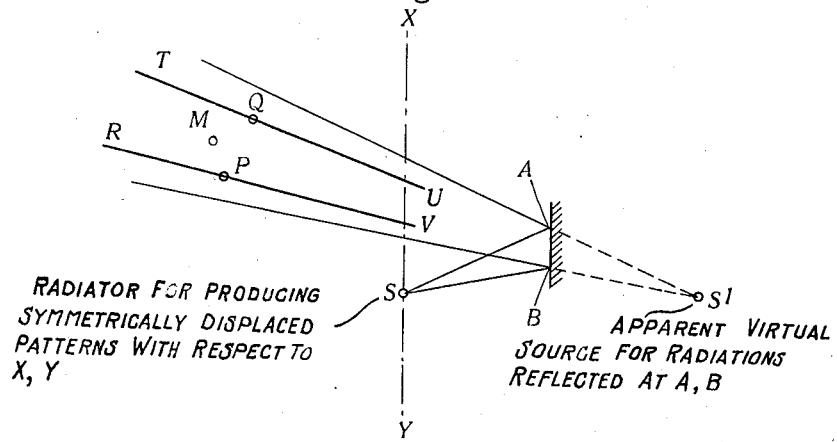
Fig. 1 represents the disturbing effect on a directional diagram produced by a metallic obstacle located near the transmitter.

In Fig. 1, S represents a source of radio-electric waves. It is assumed that this source S is radiating so that its characteristic diagram is symmetrically deflected with respect to the directive axis XY by means not shown, for example, according to the known method employing complementary signals in systems for guiding vehicles. AB represents an obstacle near the source S and is shown plane for the purpose of simplicity in explanation, but which may be of any shape and dimensions. The portion of waves emitted by the source S which is reflected from AB appears to come from a virtual source S' symmetrically located on the opposite side of the plane AB with respect to $S_1$ in the case under consideration. The phase and amplitude of this virtual source in relation to those of the source S depend on the nature of the obstacle AB. Consequently, any point M situated on the other side of S with respect to AB will be subjected both to the direct radiation of S, and to the radiation reflected by AB. When the signalling by S is by complementary signals such as dashes on the left of the axis XY and dots on the right, for example, a receiver located at the point M will receive a direct radiation in which the normal signals predominate, and a reflected radiation in which the emitted signals from the other side of the axis XY (dot) predominate. There will be no longer any clear indication of the position of point M with respect to the axis XY.

Moreover, there are points such as P or Q in which the intensity of the signal in spite of the signal changes, remains constant according to the relative phases and amplitudes of the direct and deflected signals. The positions receiving dot signals such as P and Q are represented, for example, by the curves RV and TU. On these curves the signalling received will be a continuous dash as on the axis XY; such curves will be called false axes.

These false axes can obviously be eliminated by arranging that the source S does not radiate in the directions directed to the obstacle AB. In practice this solution has not always been possible. One object of the present invention is consequently to provide arrangements for practically eliminating this error due to reflection, whatever be the relative positions of the source and obstacle or obstacles.

Figure 2:
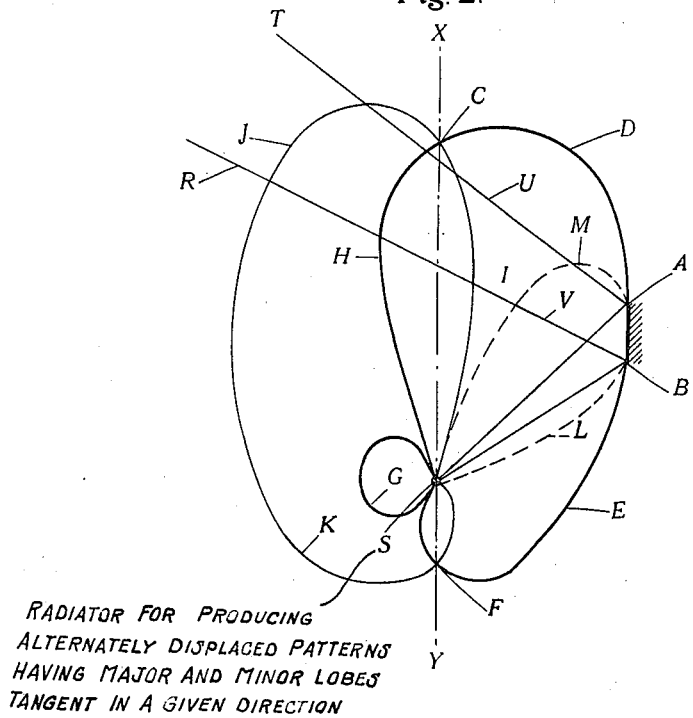
Fig. 2 shows a radiation diagram modified so as to eliminate this disturbing effect.

In accordance with the present invention the source S is adapted to emit in the directions passing through the obstacle AB a continuous signal independent of the signal change. The Fig. 2 shows an example of a radiation diagram of the source S, in which the bad influence of the obstacle AB is practically eliminated.

In this drawing the source S and the obstacle AB are indicated. During one period of radiation the radiation diagram is SHCDEFG, which diagram is shown in thick lines on the drawings. During the alternate period of radiation the radiation diagram of the sources becomes SICJKFLM. It will be seen that the two diagrams are tangential along parts of their outline, giving at these tangent points of contact a pseudo-axis. This pseudo-axis by suitable adjustment is caused to coincide with the obstacle AB. Under these conditions the radiation reflected by AB is a continuous signals of constant amplitude and its superposition in the region comprised between RV and TU on the alternate signals directly radiated from the source S will in no way modify the nature of the resultant signal. The lines RV and TU are thus no longer false-axes and the signaling becomes normal again.

Figure 3:
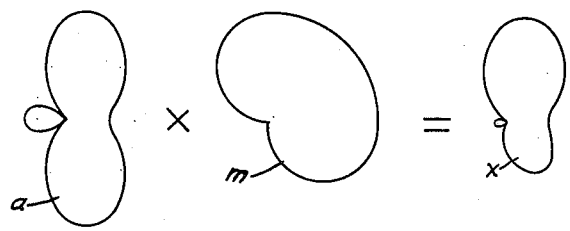
Figs. 3 and 4 show one way of deriving a pair of radiator diagrams suitable for practicing the invention.
Figure 4:
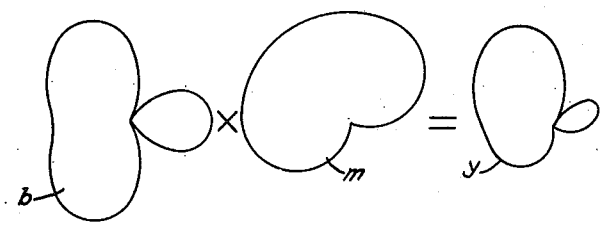

Radiation patterns suitable for practicing the invention may be produced in any known manner. Figs. 3 and 4 show one way of deriving suitable patterns $x$ and $y$ from certain elementary patterns $a$, $b$, $m$, which are well known and are shown, for example, in an article by Foster, published in the Bell System Technical Journal of April 1926.

Pattern $a$, which is a narrow dumb-bell with a small minor lobe, represents the radiation from an array of two elements spaced apart a half wavelength and energized with equal powers but with a 45° phase difference. Pattern $b$, which is less narrow and has a larger minor lobe, represents the radiation from a similar array if the phase difference is 90°. Both these patterns are of a general shape suitable for practicing the method of Fig. 2 except that these patterns $a$ and $b$ are bi-directional rather than uni-directional. To give patterns $a$ and $b$ a uni-directional characteristic they may be each multiplied by a well-known cardioid $m$ which may also be inclined so as to reduce the size of the minor lobes with respect to the width of the main dumb-bell in each of the patterns $a$ and $b$. For convenience, orientation of the cardioids $m$ of Figs. 3 and 4, has been so chosen that the null of these cardioids will coincide with one of the nulls already existing in patterns $a$ and $b$. This is not necessary but produces a simpler looking resultant pattern $x$ or $y$.

Figure 5:
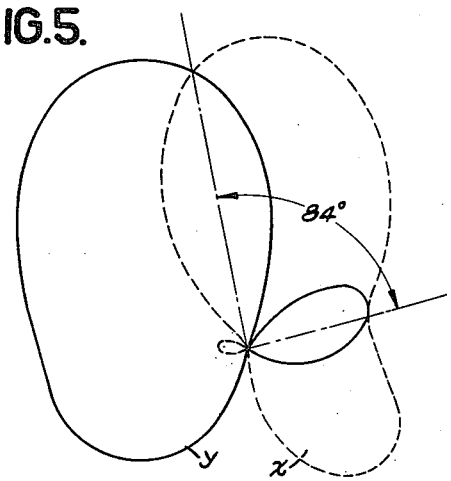
Figs. 5 and 6 show how such a pair of diagrams may be combined in varying manner to take care of obstacles at varying angles to the course.
Figure 6:
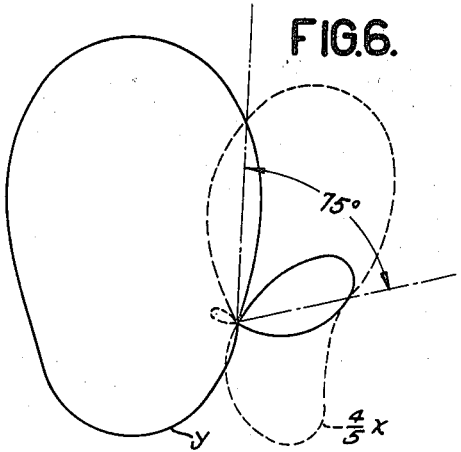

Figs. 5 and 6 show how the two patterns $x$ and $y$ may be variably combined so as to give varying angles between the course line and the direction in which the minor lobe of $y$ lies tangent to the pattern $x$. Such variation makes it possible to accommodate obstacles having different angular positions with respect to the desired course line.

Figure 7:
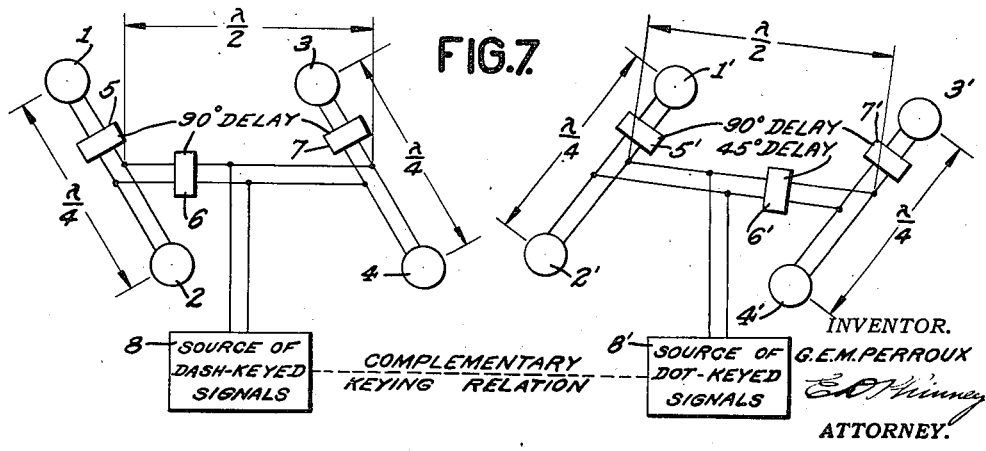
Fig. 7 shows an array for producing the patterns of Fig. 6.

Fig. 7 shows a radiating system which could be used to give the two patterns of Fig. 6. For pattern $y$, four dipoles 1, 2, 3, 4, are used, which may be considered as a master array of two elements spaced one-half wavelength apart and energized from source 8 with a 90° phase difference provided by network 6, each element of said master array being itself a sub-array made up of two dipoles spaced one-quarter of a wavelength apart and given a 90° phase difference by network 5 or 7. The characteristics of the master array are those of pattern $b$, Fig. 4, while the characteristics of each sub-array are those of pattern $m$, Fig. 4. Thus the complete radiation characteristic of the four dipoles 1, 2, 3, 4, positioned and phased as shown, will correspond to $b \times m$, that is to $y$, Fig. 4.

In a similar manner the four dipoles 1', 2', 3', 4', produce a pattern corresponding to $x$, Fig. 3, the main array in this case comprising the two sub-arrays 1', 2', and 3', 4' spaced one-half wavelength apart, and given a 45° phase difference by network 6', so as to give a radiation pattern similar to $a$. Each of the sub-arrays 1', 2' or 3', 4', has its two dipoles spaced one-quarter wavelength apart and given a 90° phase difference by its network 5' or 7'. Thus each sub-array has a radiant pattern like $m$, Fig. 3.

The whole pattern $x$ is reduced in size compared to pattern $y$ by reducing the power of source 8' compared to that of source 8 and is tilted with respect to pattern $y$ so as to just make the minor lobe of $y$ tangent to the curve $\frac{4}{5}x$, Fig. 6.

In this method of elimination of harmful effects produced by reflection from objects it is necessary to create a pseudo-axis in the direction from S to AB. Certain drawbacks may appear to result from this which, however, are more theoretical than practical. On the one hand it is generally possible to locate the source S with respect to the obstacle AB so that this pseudo-axis makes an angle with the main axis XY to be marked. On the other hand, any ambiguity can be eliminated by arranging for the source S to emit in addition to the main radiations an auxiliary radiation concentrated in the direction AB and modulated in a characteristic manner.

It is clear that the invention is not limited to the presence of a single reflecting object, nor to the form of the diagrams shown, but that it can on the contrary be employed whenever a source of directional radio-electric waves has to emit in one or more particular angular areas a continuous radiation in order to avoid undesirable or harmful effects which may be caused in these directions.

What is claimed is:

1. In a radio directive antenna system, the method of eliminating disturbances caused by reflection of radiation from reflecting objects located within the radiation pattern which includes, radiating from the antenna system directive waves of a predetermined characteristic, and also radiating waves of a different characteristic and directing them toward said object, the characteristics of both sets of waves being correlated so that when both are reflected from said object, false directive signals are avoided.

2. In a radio directive antenna system in which the radiation pattern is subject to movement, the method of eliminating disturbances caused by reflection from a reflecting object which includes, radiating a radiation pattern having a major and minor lobe, varying the shape of said pattern in synchronism with the movement of the pattern so that during the period when the object is outside the principal lobe, it is in the field of the minor lobe, and also directing auxiliary waves of a different character, the radiation of the object by both radiations being timed so as to produce a continuous radiation from the object.

3. In a radio directive antenna system in which the radiation pattern is oscillated about a mean directive axis, and different signals are transmitted when the pattern is on different sides of the directive axis, and a continuous dash is obtained in the space overlapped by the radiation along the line of the directive axis, the method of eliminating disturbances due to reflection of the radiations when the pattern is on one side of said directive axis from a reflecting object which consists in shaping the radiation pattern when on the opposite side of the directive axis with respect to the reflecting object to produce a minor lobe extending generally along a line directed toward the reflecting object and having a signal strength along said line substantially the same as the signal strength of said pattern along said line when on said one side of said directive axis, so that the signals reflected from the said object produce a continuous dash.

4. In a radio directive antenna system in which the radiation pattern is subject to movement to direct the principal lobe of the pattern in different directions, the method of eliminating disturbances due to reflection of the radiation from a reflecting object in the range of said pattern in one position which consists in varying the shape of the radiation pattern in synchronism with the movement thereof to produce a minor lobe directed towards the reflecting object which is tangential to the principal lobe when said principal lobe is directed towards the object, and arranging that the point of contact of the two lobes lies on the reflecting object.

5. In a radio directive antenna system in which the principal lobe of a radiation pattern is oscillated about a mean directive axis, and different signals are transmitted when the diagram is on different sides of the directive axis and a continuous dash is obtained in the space overlapped by the radiation pattern when on either side of the directive axis, the method of eliminating disturbances due to reflection of the radiations from a reflecting object in the field of said pattern on one side of said axis which consists in varying the shape of the radiation pattern in synchronism with the movement thereof to produce a minor lobe directed towards the reflecting object which is tangential to the principal lobe when said principal lobe is directed towards the object, and arranging that the point of contact of the two lobes lies on the reflecting object.

6. In a radio directive antenna system in which the radiation pattern is subject to movement, the method of eliminating disturbances due to reflection of the radiation from reflecting objects which consists in radiating from the antenna a directed additional radiation in the direction towards the reflecting object, during those periods when the reflecting obejct lies outside the radiation diagram of the main radiation.

7. In a radio directive antenna system in which the radiation pattern is subject to movement, the method of eliminating disturbances caused by reflection of radiation from reflecting objects, which includes, radiating waves of one characteristic to the object at predetermined intervals, radiating waves of another complementary characteristic to the object in timed relation to the first radiation, whereby there is a continuous reflection of waves from said object in a predetermined direction.

8. In a radio directive antenna system, having means to radiate a radiation pattern having a major lobe and a minor lobe, means directing the minor lobe radiation at intervals towards an object, means to direct an auxiliary radiation to said object in the intervals between the said intervals first named, said minor lobe radiations and said auxiliary radiations having complementary modulations whereby a continuous characteristic signal is reflected from said object in a predetermined fixed direction.

9. A radio directive antenna system according to claim 8 in which the first-named radiating means produce a minor lobe which oscillates with respect to the object.

10. A radio directive antenna system according to claim 8 in which means are provided to move the radiation pattern and to vary its shape in synchronism, and means to adjust the size of said minor lobe so that it is tangential to the position of the major lobe when the latter is directed in the same direction, the point of tangency being correlated with the position of said object.

11. A radio directive antenna system having means to radiate a signal radiation pattern oscillating about a mean directive axis, means to radiate signals complementary to the first signals when the diagram is on either side of said axis to produce a continuous dash in the space which is continuously overlapped by the radiation diagrams, and means for varying the shape of the radiation diagram in synchronism with its movement so as to produce a minor lobe directed towards a reflecting object when the major lobe moves away from said object.

GEORGES EDME MARCEL PERROUX.